(12) United States Patent
Thalappil et al.

(10) Patent No.: US 12,454,473 B2
(45) Date of Patent: Oct. 28, 2025

(54) INTEGRATED CDI ELECTRODE

(71) Applicant: INDIAN INSTITUTE OF TECHNOLOGY MADRAS (IIT MADRAS), Chennai (IN)

(72) Inventors: Pradeep Thalappil, Chennai (IN); Md Rabiul Islam, Chennai (IN); Soujit Sengupta, Chennai (IN); Srikrishnarka Pillalamarri, Chennai (IN); Sourav Kanti Jana, Chennai (IN)

(73) Assignee: INDIAN INSTITUTE OF TECHNOLOGYMADRAS (IIT MADRAS), Chennai (IN)

( * ) Notice: Subject to any disclaimer, the term of this patent is extended or adjusted under 35 U.S.C. 154(b) by 374 days.

(21) Appl. No.: 16/958,971

(22) PCT Filed: Dec. 29, 2018

(86) PCT No.: PCT/IN2018/050894
§ 371 (c)(1),
(2) Date: Jun. 29, 2020

(87) PCT Pub. No.: WO2019/130355
PCT Pub. Date: Jul. 4, 2019

(65) Prior Publication Data
US 2020/0331778 A1    Oct. 22, 2020

(30) Foreign Application Priority Data
Dec. 30, 2017   (IN) .............. 201741047400

(51) Int. Cl.
*C02F 1/469* (2023.01)
*C02F 1/461* (2023.01)

(52) U.S. Cl.
CPC ........ *C02F 1/4691* (2013.01); *C02F 1/46109* (2013.01); *C02F 2001/46133* (2013.01)

(58) Field of Classification Search
CPC ...... C02F 1/4691; C02F 1/46109–2001/46171
See application file for complete search history.

(56) References Cited

U.S. PATENT DOCUMENTS

2012/0132519 A1   5/2012  Kang et al.
2014/0346046 A1   11/2014 Andelman

FOREIGN PATENT DOCUMENTS

CN    102417217 A    4/2012
KR    10-1207463 B1  12/2012
(Continued)

OTHER PUBLICATIONS

Tuan et al ("Improvement of water softening efficiency in capacitive deionization by ultra purification process of reduced graphene oxide", Current Applied Physics, vol. 15, Issue 11, Nov. 2015, pp. 1397-1401) (Year: 2015).*

(Continued)

*Primary Examiner* — Alexander W Keeling
(74) *Attorney, Agent, or Firm* — DITTHAVONG, STEINER. & MLOTKOWSKI

(57) ABSTRACT

Reduced graphene oxide@polystyrene (RGO-PS) composite was synthesized using reduced graphene oxide (RGO), styrene monomer and divinylbenzene through an in-situ polymerization process. The RGO-PS composite was functionalized with sulfonate and quaternary amine functionalities for making positive and negative integrated electro-adsorbent-ion exchange resins (EAIERs), respectively. These EAIERs 'molecular constructs' were used as CDI electrodes and desalination was performed for the removal of different ions. A high electro-adsorption capacity of ~15.93 mg/g for Cl⁻ using 802 μS NaCl solution was observed in laboratory batch experiments which was much higher than the adsorption capacity of RGO electrodes reported earlier (~2-3 mg/g).

14 Claims, 16 Drawing Sheets

(56) References Cited

FOREIGN PATENT DOCUMENTS

| WO | 2015/076586 A1 | 5/2015 |
| WO | 2017/018945 A1 | 2/2017 |

OTHER PUBLICATIONS

Wu et al ("Synthesis of network reduced graphene oxide in polystyrene matrix by a two-step reduction method for superior conductivity of the composite", Journal of Dynamic Chemistry, 2012, 22, 17254-17261) (Year: 2012).*

Liu et al ("Separation and recovery of heavy metal ions and salt ions from wastewater by 3D graphene-based asymmetric electrodes via capacitive deionization", Journal of Materials Chemistry A, Jun. 2017, 5, 14748-14757) (Year: 2017).*

Li et al ("The capacitive deionization behaviour of a carbon nanotube and reduced graphene oxide composite", Journal of Materials Chemistry A, 2013, 1, pp. 6335-6341) (Year: 2013).*

Lu et al ("Polystyrene/graphene composite electrode fabricated by in situ polymerization for capillary electrophoretic determination of bioactive constituents in Herba Houttuyniae", Electrophoresis, 2011, 32, pp. 1906-1912) (Year: 2011).*

Porada et al ("Review on the science and technology of water desalination by capacitive deionization", Progress in Materials Science, vol. 58, Issue 8, Oct. 2013, pp. 1388-1442 (Year: 2013).*

Jia et al ("Preparation and Application of Electrodes in Capacitive Deionization (CDI): a State-of-Art Review", Nanoscale Research Letters, (2016), 11:64) (Year: 2016).*

Gao et al ("A New Partially Reduced Graphene Oxide Nanosheet/ Polyaniline Nanowafer Hybrid as Supercapacitor Electrode Material", Energy Fuels, 2013, 27, 1, 568-575) (Year: 2013).*

Liu et al ("Graphene-based materials for capacitive deionization", J. Mater. Chem. A, Jun. 2017, 5, 13907-13943). (Year: 2017).*

Saghatforoush et al ("Polystyrene-graphene oxide modified glassy carbon electrode as a new class of polymeric nanosensors for electrochemical determination of histamine", Chinese Chemical Letters, 25 (2014) 655-658). (Year: 2014).*

Nan Wu et al., "Synthesis of network reduced graphene oxide in polystyrene matrix by a two-step reduction method for superior conductivity of the composite", Journal of Materials Chemistry, 22(33), 17254, Jun. 22, 2012 (Jun. 22, 2012) DOI:10.1039/ c2jm33114d (See p. 3), 10 pages.

Fawad Ahmad et al., Desalination of Brackish Water Using Capacitive Dionization (CDI) Technology; Desalination an Dwater Treatment, 2016, 57:17, pp. 7659-7666, DOI: 10,10880/ 19443994,2015,1037357; To link to this article: https://doi.org/10. 1080/19443994.2015.1037357.

Isabel Villar et al., Capacitive Dionization of NaC1 Solutions With Modified Activated Ccarbon Electrodes, Engery Fuels 2010, 24, pp. 3329-3333; DOI: 10.1021/ef901453q, Published on Web Mar. 30, 2010.

Yu-Jin Kim et al., Improvement of Desalination Efficiency in Capacitive Deionization Using a Carbon Electrode Coated With an Ion-Exchange Polymer, Water Research 44 (2010) pp. 990-996.

Diani Ainun Nisa et al., Enhanced Salt-Removal Percentage in Capacitive Deionizatin Of NaCl Solutions With Modified Activated Carbon Electrodes By HNO3, 2017 IOP Conference Series: Materials Science Engineering 214 (2017) 012024.

Peiying Liu et al., Graphene-Based Materials for Capacitive Deonization, Journal of Materials Chemistry A, Jun. 6, 2017, DOI: 10.1039/ C7TA02653F, 40 pages.

* cited by examiner

INTEGRATED CDI ELECTRODE

FIELD OF THE INVENTION

The present invention relates to the use of capacitive deionization (CDI) technology for the removal of salts from brackish water.

BACKGROUND OF THE INVENTION

The availability of clean potable water at an affordable cost is a growing challenge for mankind. Drinking water is in jeopardy due to growing population, climatic changes and contamination of various water resources [Hoekstra, A. Y. et al., Nature Clim. Change, 2014, 4, 318-320; Pugazhenthiran, N. et al., ACS Appl. Mater. Interfaces, 2015, 7, 20156-20163; Schewe, J. et al., PNAS, 2014, 111, 3245-3250; Shannon, M. A. et al., Nature, 2008, 452, 301-310]. To meet the growing demand of drinking water, many materials and methods (i.e. reverse osmosis (RO), ultrafiltration (UF), adsorption, photocatalytic degradation and distillation, etc.) are being used. Some of these techniques are expensive and they consume high energy [Porada, S. et al., ACS Appl. Mater. Interfaces, 2012, 4, 1194-1199]. Capacitive deionization (CDI) is a growing technology which involves adsorption and desorption processes making it both energy and cost efficient than many of the aforementioned methods of desalination of brackish water. When a potential difference is applied to a pair of porous carbon electrodes, cations and anions move toward cathode and anode, respectively and get adsorbed, thereby generating 'drinkable' water from brackish water. Subsequently, adsorbed ions can be removed from the electrode by reversing the polarity of the electrode which leads to the regeneration of the electrodes and the same surface can be used again for further removal of ions [Porada, S. et al., ACS Appl. Mater. Interfaces, 2012, 4, 1194-1199; Porada, S. et al., Prog. Mater. Sci., 2013, 58, 1388-1442; Suss, M. E. et al., Energy Environ. Sci., 2012, 5, 9511-9519; Suss, M. E. et al., Environ. Sci. Technol., 2014, 48, 2008-2015]. CDI is cost-effective having point-of-use utility along with high theoretical efficiency. However, its practical applications for desalination are yet to be recognized and research is being carried out to discover new materials with improved absorption capacities [Porada, S. et al., Prog. Mater. Sci., 2013, 58, 1388-1442; Suss, M. E. et al., Energy Environ. Sci., 2012, 5, 9511-9519; Suss, M. E. et al., Environ. Sci. Technol., 2014, 48, 2008-2015; Tsouris, C. et al., Environ. Sci. Technol., 2011, 45, 10243-10249; Dlugolęcki, P. et al., Environ. Sci. Technol., 2013, 47, 4904-4910].

Various carbonaceous materials and their composites are used as CDI electrodes for higher efficiency in terms of salt adsorption capacity in the range of mg/g. Materials such as graphene [Amiri, A. et al., Sci. Rep., 2015, 5, 17503], graphene-like nanoflakes [Wang, H. et al., J. Mater. Chem., 2012, 22, 23745-23748], functionalized reduced graphene oxide (RGO) [Li, H. et al., J. Mater. Chem., 2009, 19, 6773-6779], graphene-carbon nanotubes (CNT) composites [Li, H. et al., Environ. Sci. Technol., 2010, 44, 8692-8697], 3D macroporous graphene architectures [Wang, H. et al., J. Mater. Chem. A., 2013, 1, 11778-11789], sponge-templated graphene [Jia, B. et al., Chem. Phys. Lett., 2012; 548:23-28], graphene-$Fe_3O_4$ [Yang, Z. Y. et al., Adv. Funct. Mater., 2014, 24, 3917-3925], graphene chitosan-$Mn_3O_4$ [Xu, X. et al., Sci. Rep., 2015, 5, 8458], RGO-activated carbon (AC) composites and functionalized graphene nanocomposite have shown adsorption capacities of 1.85, 1.35, 3.2, 1.4, 3.9, 4.95, 10.30, 12.7, 2.94 and 3.47 mg/g, respectively. One of the targets of the present invention is to make this technology more energy efficient and cost-effective, both for deionization of seawater and brackish water. Large brackish water resources, especially in the coastal areas, can be used for human consumption and other needs such as those of washing, agriculture and industry by such process. From a materials science point of view, synthesizing new materials and design strategies for novel and improved electrodes is a challenging task. Selecting the right material for the electrode, which is energy efficient, is still a vital aspect of the technology. Naturally, the choice of electrode material largely depends on the required performance (desalting capacity and initial salt concentration), system requirements (flow rate and stack configuration) and cost considerations (efficiency, per unit cost and lifetime). However, many researchers are examining methods to improve the efficiency of the CDI materials and to reduce the cost. Mostly, carbon materials are used for CDI technology, but for better performance of the CDI, novel materials can be integrated with carbon materials for electrode preparation [Yang, J. et al., Desalination, 2011, 276, 199-206; Zou, L. et al., Water Res., 2008, 42, 2340-2348; Porada, S. et al., Prog. Mater. Sci., 2013, 58, 1388-1442]. Electrode adsorption capacity is not only related to the total pore volume, pore size, pore connectivity and surface area of the material but also related to electrical conductivity and electrochemical stability of the electrode. The most important requirements for CDI electrode materials and their relation to CDI performance are based on: i) large ion-accessible specific surface area, ii) high (electro) chemical stability over the used pH and voltage range (no oxidation) which is important to ensure longevity and system stability, iii) fast ion mobility within the pore network, iv) high electrical conductivity, v) good wetting behavior, vi) low cost, vii) scalability and viii) high bio-inertness (prevent the biofouling of the electrode for long-term operation in surface or brackish water). All of these have to be accomplished at a reduced cost. Performing CDI experiment by incorporating ion-exchange membranes (IEMs) in front of the carbon electrodes is called membrane capacitive deionization (MCDI). Covalently bound linkers, sulfonate- or quaternary amine-containing IEMs are mostly used due to their high internal charge which plays an important role in selective ion (the counterion) transport. Biofouling would be reduced by using IEMs on top of the carbon electrodes. When a cell voltage is applied to the CDI electrodes, ions with opposite charges known as counterions are adsorbed in the electrical double layers (EDLs) that are formed within the intraparticulate nanostructure within the porous carbon electrodes accessible to the water, while the ions of same charge known asco-ions are removed from the electrodes which populate in the spacer channel. These co-ions present in the spacer channel further prevent the counterions to come to the EDLs for further removal and hence, decreases the adsorption capacity. In case of MCDI, due to the presence of the membrane in front of the electrodes, the co-ions are blocked by it which stays in the macropores of the porous carbon region. Counterions from the ion exchange membrane moves to neutralize the charge of the co-ions. In the case of MCDI the counterions are adsorbed in the EDLs as well as in the porous carbon electrodes, therefore increase the adsorption capacity of the electrodes. An MCDI system shows higher desalination performance, salt removal rate and low electrical energy consumption compared to the CDI system. Though MCDI has several advantages than conventional CDI but its major drawback is the weak adhesion between the electrode material and the membranes, which leads to high contact resistance. Another disadvantage is that all the ion exchange membranes are hydrophobic in nature and have poor wetting characteristics. This leads to low removal efficiency of the ions, generally at low salt concentrations.

Electrode materials need to be embedded/printed on a stable conducting surface which often requires the use of a binder that reduces the available surface area, which can be resolved by integrating electro-adsorbent materials with ion-exchange resin via a covalent linkage. The discovery of graphene has made it extremely beneficial for CDI technology. Due to its large surface area and tunable functionality, it is possible to retain adsorption capacity even while maintaining proper covalent linkages. Selective edge functionalization of reduced graphene oxide (RGO) is possible to create a single molecular construct having both electro-adsorption and ion permeable characteristics. A device using this material for selective anion and cation permeation has been assembled for an efficient covalently linked IERs-CDI electrode. This methodology helps to pre-concentrate the target ions and block the co-ions, which allows rapid brackish water desalination, where the material retains its conductivity and wetting characteristic unlike in the case of MCDI It is important to point out mixing graphene and ion exchange resin without covalent linkage will not produce the desired result.

SUMMARY OF THE INVENTION

The present invention relates to the use of capacitive deionization (CDI) technology for removing salts from brackish water and more particularly to the detailed synthesis protocol, fabrication steps and mechanisms of salt removal.

In one embodiment, the present invention describes the preparation of the electrode for CDI via in-situ polymerization with styrene monomer onto RGO to create a single molecular construct for electro-adsorption and selective ion permeation. Positively and negatively charged electro adsorbent-ion exchange resins (EAIERs) were synthesized with sulfonate and quaternary amine functionalities, respectively. Primarily, RGO-PS composite was functionalized by incorporating the sulfonate and quaternary amine moieties. Individual RGO sheets with such selective functionalization are referred to as the molecular constructs. The covalent construct is mixed with additives including carbon nanotubes (CNTs), fullerenes and carbon fibers to enhance the performance. These EAIERs 'molecular constructs' were used as CDI electrodes and further used in desalination process for the removal of different ions.

In another embodiment, the present invention describes the fabrication of these electrodes. The electrode material was blended along with limited quantities of polyvinylidene fluoride (PVDF) as a binder (~15 wt %), and coated on a graphite sheet which was cured overnight to make working electrodes.

In another preferred embodiment, the present invention illustrates the assembly of electrodes, comprising chemically-linked reduced graphene oxide cationic and anionic exchange resins molecular constructs used for the removal of salt species (viz. sodium chloride (NaCl), magnesium chloride ($MgCl_2$), ferric chloride ($FeCl_3$), sodium nitrate ($NaNO_3$), sodium fluoride (NaF) and sodium sulfate ($Na_2SO_4$)) under external applied potential. It also gives insight into the mechanism of salt adsorption and desorption.

Figure 1:
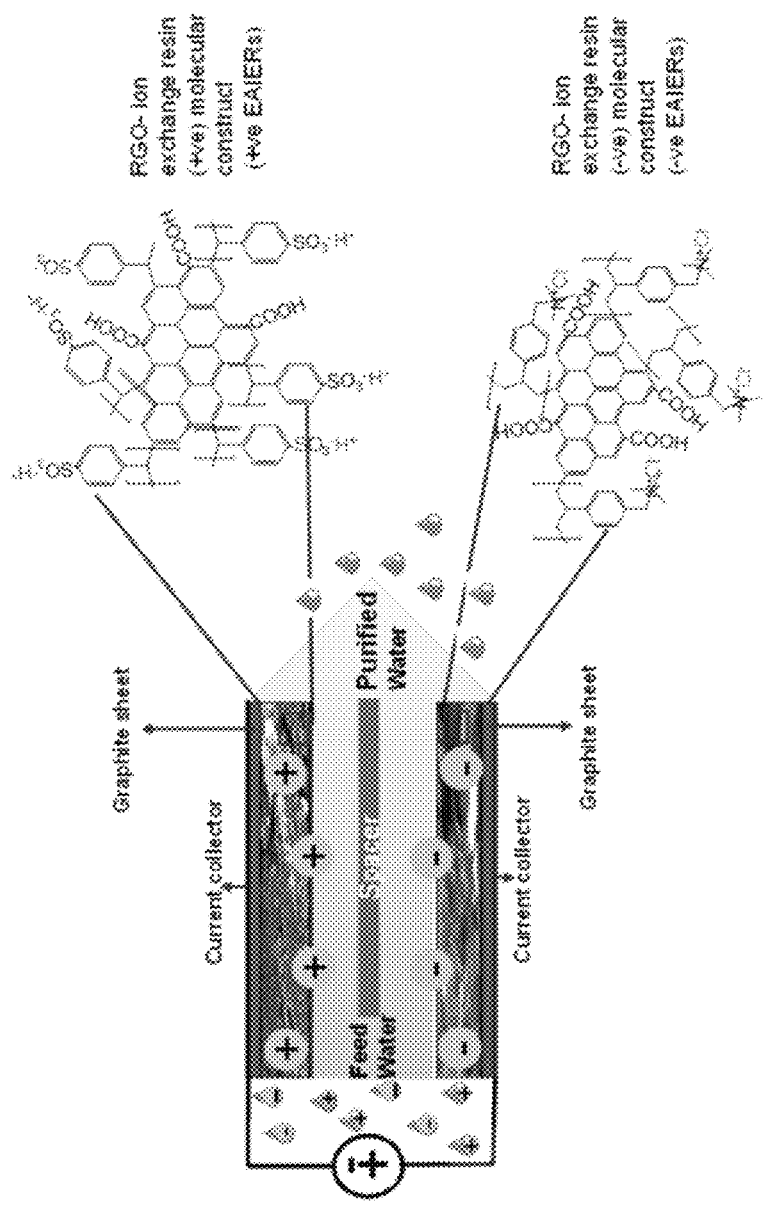
FIG. 1—Schematic design of a cell with integrated EAIERs (molecular construct) for capacitive deionization (CDI). The RGO sheets have —COOH functionalization.

Referring to the drawings, the embodiments of the present invention are further described. The figures are not necessarily drawn to scale, and in some instances the drawings have been exaggerated or simplified for illustrative purposes only. One of ordinary skill in the art may appreciate the many possible applications and variations of the present invention based on the following examples of possible embodiments of the present invention.

DETAILED DESCRIPTION OF THE INVENTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The present invention relates to the development of the CDI electrode for salt removal from brackish water. FIG. 1 depicts the schematic representation of a cell with an integrated EAIERs electrode for CDI. According to the invention, the EAIERs materials were coated on the current collector (graphite sheet) and a potential was applied to drive the ions separating them from the input water using an external DC power source.

Synthesis of graphene oxide (GO) by the modified Hummer's method, which was further reduced using ammonia and hydrazine hydride [Park, S. et al., Carbon, 2011, 49, 3019-3023] in the ratio of (3:1) with continuous stirring for 12 h at 95° C. After completion of the reaction, the formed reduced graphene oxide was washed with deionized (DI) water several times and dried using a freeze dryer. RGO (1 g), styrene (ST) monomer and divinylbenzene (DVB) were taken in the ratio of 10:1:0.1 in 25 mL DI water and ultrasonicated for 10 min to obtain the uniform dispersion. Polymerization process was carried out in inert condition (using N$_2$ gas). Typically, 1 g of RGO, 100 mg of styrene monomer and 10 mg of divinylbenzene mixture were added to 250 mL, 3 necked round bottom flask containing 25 mL of DI water. This solution was stirred for 15 min, and then 320 mg of K$_2$S$_2$O$_8$ was added to the reaction mixture. The reaction mixture was stirred at room temperature for the next 30 min and the temperature was gradually increased to 70° C. and maintained for 1 h, which was maintained at 80-85° C. for 12 h and further the temperature was increased to 90-95° C. for 2 h. After completion of the reaction, the formed RGO-PS composite was washed with hot DI water and dried overnight at 90° C. in a hot air oven.

For making anionic EAIERs (−veEAIERs), anchoring of chloromethyl group to the network of the polymer composite (RGO-PS) is essential, for which Friedel-Craft alkylation reaction was performed. The polymer composite (1 g) and chloromethyl methylether (3 mL) were mixed in 10 mL DI water, to swell the cross-linked polymer for 2 h at room temperature. ZnCl$_2$ (~380 mg) was added to it and the reaction was stirred for 12 h at 35-38° C. (room temperature). The chloromethylated product was washed with acetone several times and dried for 60° C. overnight. The chloromethylated product was immersed in 1,2-dichloromethane (DCM) for 2 h to swell. Trimethylamine hydrochloride (1 g) was then added to the resultant mixture and the reaction was continued for next 6 h at room temperature. The final chloro-aminated product (or −veEAIERs) was dried at 60° C. overnight [Li, Y. et al., RSC Adv., 2015, 5, 2550-2561; Li, Y. et al., J. Appl. Polym. Sci., 2015, 132, 41234/1-41234/8].

To synthesize cationic EAIERs (+veEAIERs), RGO-PS composite (1 g) was dispersed in 20 ml of 4 M H$_2$SO$_4$ and stirred for 24 h at 100° C. After completion of the reaction, the formed +veEAIERs were kept it in a hot air oven at 60° C. for drying [Yao, Y. F. et al., ACS Appl. Mater. Interfaces, 2011, 3, 3732-3737; Li, H. Y. et al., J. Membrane Science, 2014, 466, 238-245].

Figure 2:
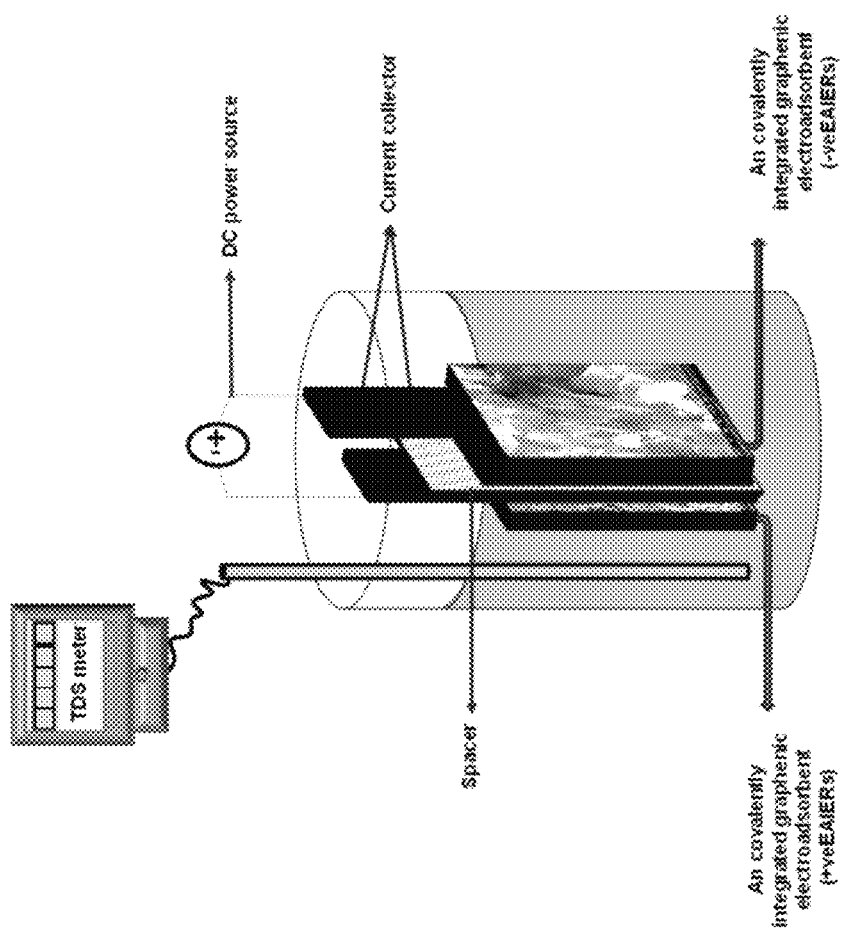
FIG. 2—Schematic representation of a CDI set-up used for measuring CDI performance.

To assemble the electrodes, EAIERs and ~15 wt % of PVDF were dispersed in DMF solution and stirred to make a homogeneous viscous slurry. This was then coated to on a graphite sheet and kept for curing. The sheet was then immersed in deionized (DI) water overnight before performing any experiments. A laboratory-scale CDI batch experiment was performed by a single pair of EAIERs electrodes, as shown in FIG. 2. Graphite rods were used as the current collectors and the spacing between the two electrodes was maintained at ~0.4 mm by using a nylon membrane.

This single electrode set-up was immersed in a 100 mL beaker containing 80 mL of saline water containing different ions at varied conductivity (450, 610 and 802 μS). By applying a potential difference on the electrodes, the cations and anions from the feed water get adsorbed on the cathode and anode, respectively. This process will continue until the electrodes become saturated and the system attains equilibrium. The regeneration of the electrodes were done by reversing the polarity of the electrodes, where all the adsorbed ions were desorbed and the same surface was further used for next cycles. The maximum adsorption capacity of the material was calculated from the equilibrium adsorption curve. The temperature of the solution was kept constant at ~23-25° C.

The electro-adsorption capacity (Q, mg/g) of the electrodes was calculated using the formula:

$$Q = (C_i - C_f) * V/m$$

Where $C_i$ and $C_f$ are an initial and final concentrations of the solution (mg/L), V is the volume of the solution (mL) and m is the total mass of the electrodes (in g).

The invention may be further illustrated using the accompanying diagrams.

FIG. 1 illustrates the design of a cell with integrated EAIERs (molecular construct) for CDI. A spacer was placed between the two electrodes. The expanded view depicts the molecular construct of both +veEAIERs (RGO-ion exchange resin (+ve) molecular construct) and −veEAIERs (RGO-ion exchange resin (−ve) molecular construct). The basic mechanism underlying CDI is schematically depicted in FIG. 1 (Porada, S. et al., Prog. Mater. Sci., 2013, 58, 1388-1442).

FIG. 2 illustrates the experimental set-up for analysing the salt adsorption-desorption in batch process. The DC power source supplies external potential to the electrodes. This potential drives the ions present in the solution toward the electrodes. A total dissolved solids (TDS) meter was immersed into the solution to measure the change in conductivity of the solution with time.

Figures 3A, 3B:
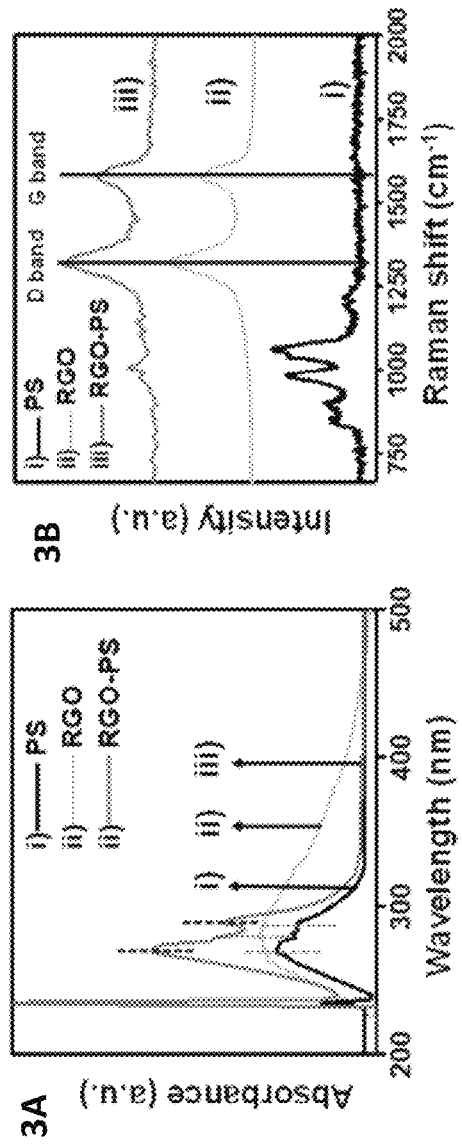
FIG. 3—A) UV-Vis absorption spectra of i) polystyrene (PS), ii) reduced graphene oxide (RGO) and iii) RGO-PS composite; and B) Raman spectra of i) PS, ii) RGO and iii) RGO-PS composite.

FIGS. 3Ai-3Aiii illustrate comparison of the UV-Vis spectral features of PS, RGO and RGO-PS. Characteristic peak maxima at ~273 and ~287 nm for PS [Li T et al., Polymer Bulletin, 1991, 25, 211-216] were observed in FIG. 3 (Ai). The characteristic peak at 277 nm in FIG. 3Aii corresponds to RGO. Two new peaks at ~270 and ~290 nm were observed for the RGO-PS composite which indicate an interaction between RGO and PS. The presence of both RGO and PS features in the spectra indicate the formation of the RGO-PS composite in FIG. 3 Aiii. Peaks at 846, 898, 980, 1063, 1192 and 1217 $cm^{-1}$ correspond to the Raman spectrum of PS [Edwards, H. G. M. et al., Vibrational Spectroscopy, 2000, 24, 213-224] in FIG. 3Bi. For the RGO-PS composite, significant peaks at 973, 1007, 1105, 1141, 1317 and 1577 $cm^{-1}$ were observed. FIG. 3Bii illustrates the Raman spectrum of RGO indicating the presence of G and D bands, which signifies $sp^2$ hybridization (graphitic signature of carbon) and disorder due to the defects induced on the $sp^2$ hybridized hexagonal sheet of carbon. Peaks at 1331 and 1580 $cm^{-1}$ in RGO are for D-band and G-band, respectively. In FIG. 3Biii, the peak position of the G-band, corresponding to RGO-PS did not shift but the position of D-band shows a considerable shift of 14 $cm^{-1}$ compared to RGO, which is likely due to the polymer chains anchored to the oxygen functionalized edges of the RGO.

Figures 4A, 4B:
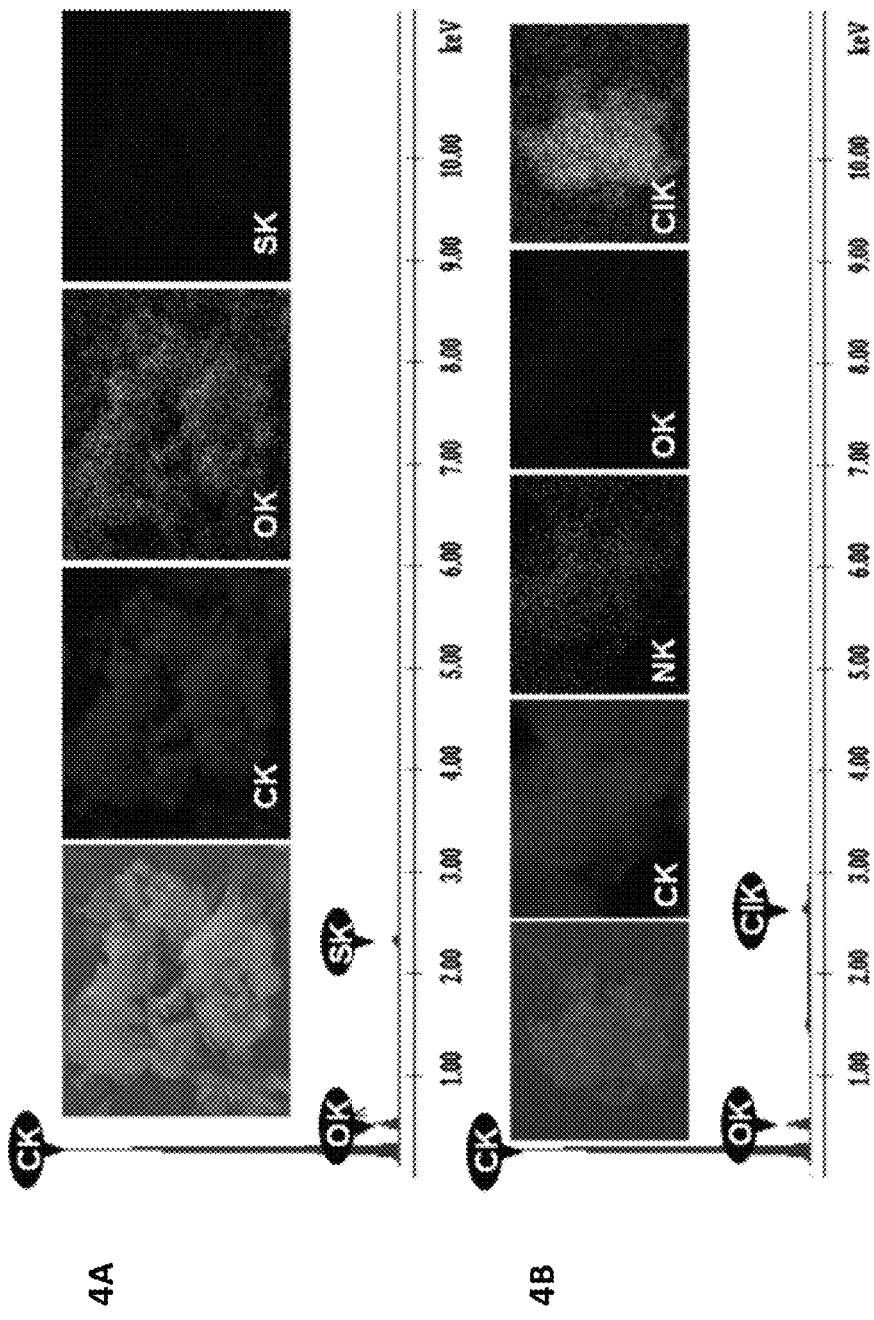
FIG. 4—SEMEDS of RGO-PS functionalized ion exchange resin of A) +veEAIERs (cation EAIERs) and B) veEAIERs (anion EAIERs). The corresponding SEM EDS and elemental mapping images are shown in the inset FIG. 5 SEM EDS of A) anode; and B) cathode (before adsorption). The SEM image and the corresponding elemental mapping images are shown in the insets. Aluminium peak came from the SEM stub.

FIG. 4A illustrates SEM EDS of +veEAIERs, which contains C, O and S as the only elements. The presence of S is due to the —$SO_3$ group after sulfonation of EAIERs. Similarly, the SEM EDS and elemental maps of –veEAIERs are shown in FIG. 4B, which contains C, O and small amounts of N and Cl due to the chloro-aminated product forming –veEAIERs. Corresponding SEM images and elemental maps are shown in the inset (FIG. 4).

Figures 5A, 5B:
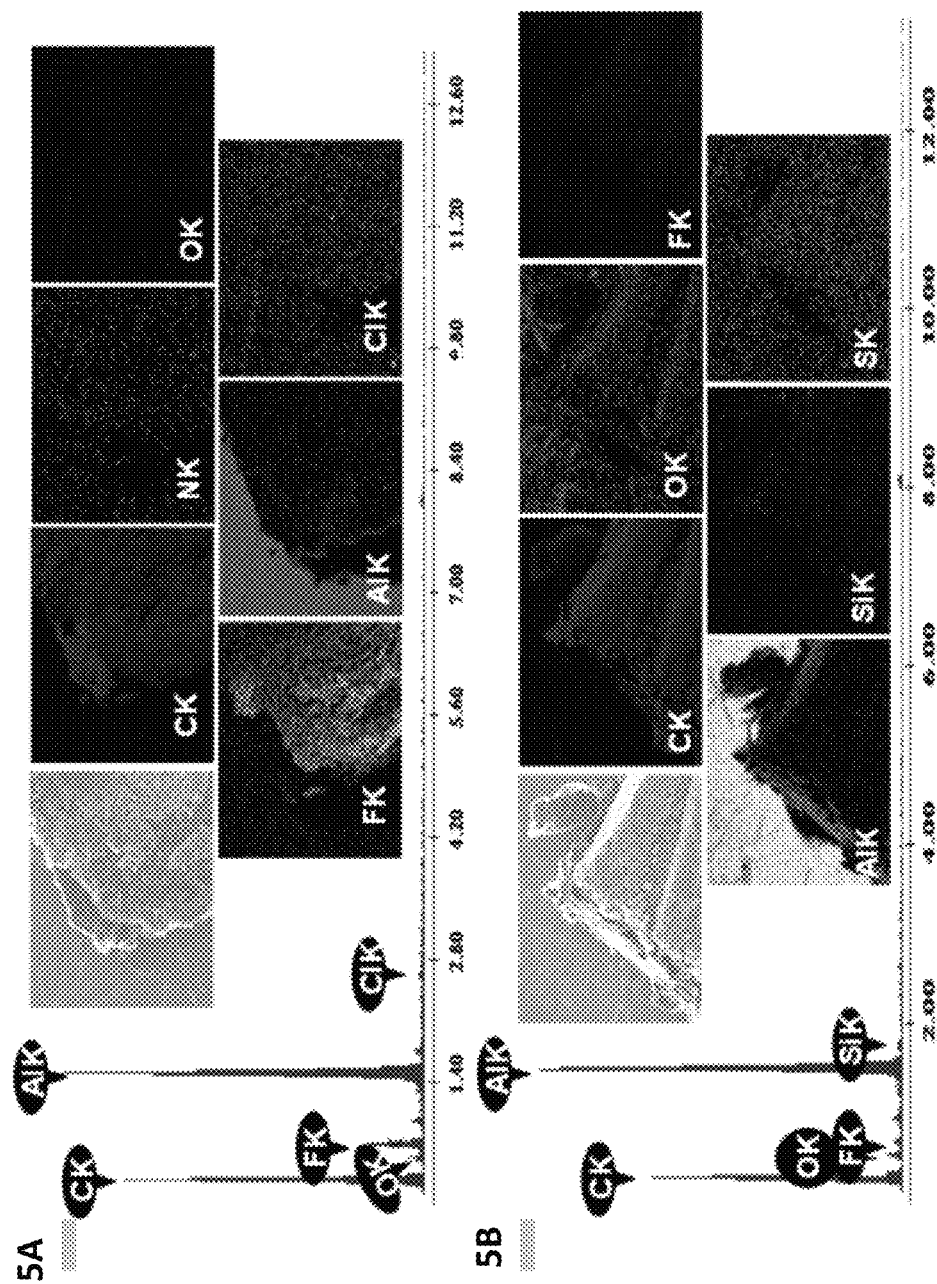

FIGS. 5A and 5B illustrate SEM EDS and elemental maps are shown for the anodic and cathodic electrodes. The functionalized EAIERs along with polyvinylidene fluoride (PVDF) which was used as a binder (~15 wt %), were coated on graphite sheet and dried to make the working electrodes. The peak for F, seen in both the cases in FIG. 3 is because of PVDF. Presence of N and Cl in FIG. 5 (A) confirm it to be –veEAIERs and the presence of S in FIG. 5B confirms it to be +veEAIERs. The presence of the peak due to aluminium in EDS is from the SEM stub.

Figures 6A, 6B, 6C, 6D:
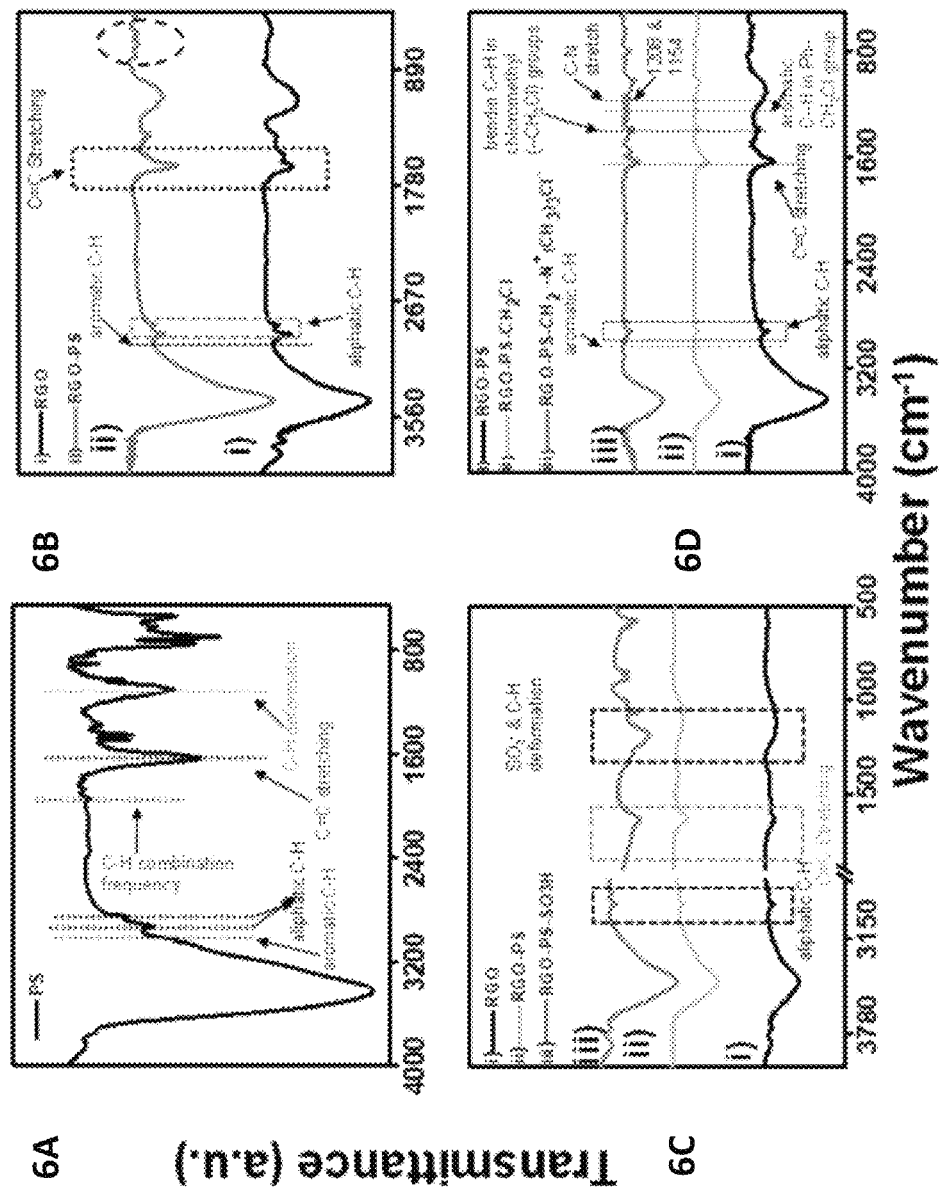
FIG. 6 Fourier transform infrared (FTIR) spectra of A) PS, B) RGO and RGO-PS, C) RGO, RGO-PS and RGO-PS-$SO_3H$ (+veEAIERs) and D) RGO-PS, RGO-PS-$CH_2Cl$ and RGO-PS-$CH_2$—$N^+(CH_3)_3Cl^-$ (-veEAIERs).

FIG. 6A illustrates the FTIR spectrum of PS showing characteristic peaks at 3035 $cm^{-1}$ for the aromatic C—H stretching vibration, 2925 and 2850 $cm^{-1}$ correspond to the asymmetric and symmetric stretching frequency of C—H groups of aliphatic C—H, 1632 and 1450 $cm^{-1}$ correspond to C═C stretching and C—H deformation frequency, respectively. FIGS. 6Bi and 6Bii illustrate the IR spectra of RGO and RGO-PS composites. The IR spectrum of RGO has been reported elsewhere. The peaks at 2924 and 2854 $cm^{-1}$ are for C—H stretching (asymmetric and symmetric, respectively) of RGO. The peak at ~1634 $cm^{-1}$ corresponds to C═C stretching frequency and the peak at ~1740-1745 $cm^{-1}$ corresponds to C═O stretching of the carboxylic acid group of RGO. The RGO-PS composite spectrum shows peaks at 2968, 2922 and 2852 $cm^{-1}$ that correspond to the C—H frequency of CH2, asymmetric and symmetric stretching frequency of C—H groups of aliphatic C—H, respectively. The peak at 1631 $cm^{-1}$ correspond to C═C stretching frequency of RGO-PS. Here, a substantial increase in the intensity of C═C is observed in RGO-PS composite which is due to the covalent linkage between RGO and PS. The spectrum confirms the formation of the RGO-PS composite. FIG. 6Ciii illustrates the FTIR spectrum of RGO-PS-$SO_3$H (+veEAIERs). The peaks at 1224 and 1180 $cm^{-1}$ correspond to S═O bond of $SO_3$H in RGO-PS composite. The peaks at 2925 and 2852 $cm^{-1}$ are for asymmetric and symmetric stretching frequency of aliphatic C—H of +veEAIERs. FIG. 6Dii indicates that after chloromethylation of RGO-PS composite, the product shows two prominent peaks at 1411 and 1261 $cm^{-1}$ which are attributed to the bending vibration of C—H in chloromethyl (—$CH_2$Cl) groups and bending vibration of aromatic C—H in Ph-$CH_2$Cl groups, respectively. Peaks at 2923 and 2851 $cm^{-1}$ correspond to C—H stretching (asymmetric and symmetric stretching, respectively) of RGO-PS-CH2Cl. FIG. 6 Diii shows FTIR spectrum of RGO-PS-$CH_2$—$N^+$ $(CH_3)_3Cl^-$ (-veEAIERs). After amination of the chlorinated product, new peaks appeared at –1208 and –1154 $cm^{-1}$, attributed to the C—N stretching of tertiary amine group in –veEAIERs. Peaks at 2962, 2924 and 2952 $cm^{-1}$ correspond to C—H stretching (for CH2, asymmetric and symmetric stretching, respectively) in –veEAIERs. Also, peaks at 1638 and 1632 $cm^{-1}$ correspond to the C═C stretching frequency of –veEAIERs and RGO-PS-$CH_2$Cl, respectively. FTIR spectra confirmed these covalent linkages between RGO and PS, and confirm the formation of anionic and cationic EAIERs.

Figures 7A, 7B, 7C, 7D:
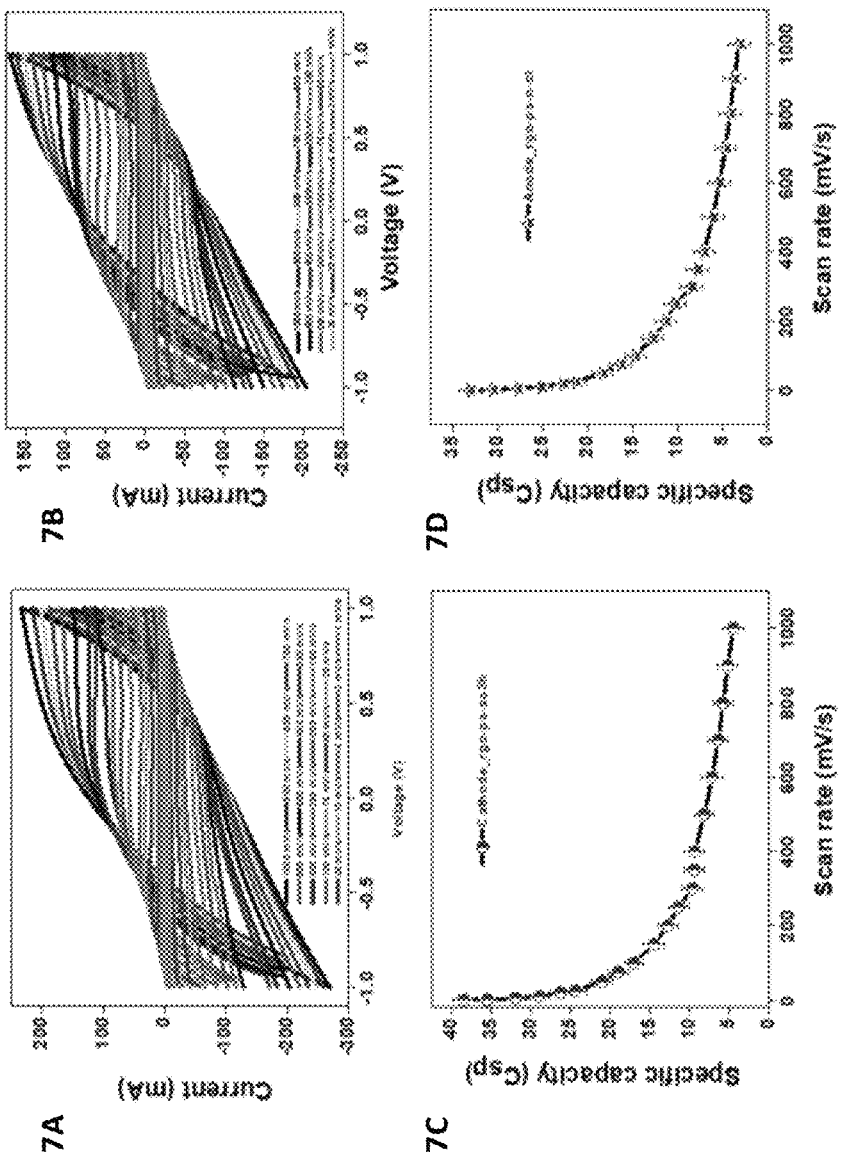
FIG. 7 Cyclic voltammetry (CV) of A) +Ve EAIERs electrode (cathode) and B) –Ve EAIERs electrode (anode) at different scan rates; C) and D) are specific capacitance vs. scan rate for both cathode and anode materials, respectively. CV potential was varied with respect to Ag/AgCl electrode using 1 M NaCl solution as the electrolyte and current was measured between working and counter electrode.

FIGS. 7A and 7B illustrate CV curves obtained at different scan rates between 1 and 1000 mV/s for cathode and anode, respectively. A noticeable change in the shape of CV curve at higher scan rates is due to large current and increased resistance. At lower scan rates, the electrolyte penetrates into the pores of the EAIERs electrode with unrestricted motion, which helps to the formation of double layer capacitance at the interface of hierarchical surface. However, at higher scan rates, ions does not have sufficient time to penetrate inside the porous structures yielding ionic transport resistance which affects the formation of the electrical double layer in the system. FIGS. 7C and 7D depict the specific capacitance vs. scan rate for both cathode and anode, respectively. CV potential varied with respect to Ag/AgCl electrode using 1 M NaCl solution as the electrolyte. The specific capacitances were found to be 38.473 F/g, 35.548 F/g, 31.928 F/g, 28.961 F/g, 26.354 F/g, 18.995 F/g, 17.066 F/g, 14.487 F/g, 12.797 F/g and 4.514 F/g at scan rates of 1 mV/s, 2 mV/s, 5 mV/s, 10 mV/s, 20 mV/s, 75 mV/s, 100 mV/s, 150 mV/s, 200 mV/s and 1000 mV/s, respectively, for +ve EAIERs. Also for –ve EAIRs, the specific capacitances were found to be 33.115 F/g, 30.596 F/g, 27.840 F/g, 25.249 F/g, 22.813 F/g, 16.405 F/g, 14.752 F/g, 12.807 F/g, 11.364 F/g and 3.181 F/g, at scan rate of 1 mV/s, 2 mV/s, 5 mV/s, 10 mV/s, 20 mV/s, 75 mV/s, 100 mV/s, 150 mV/s, 200 mV/s and 1000 mV/s, respectively.

Figures 8A, 8B, 8C, 8D:
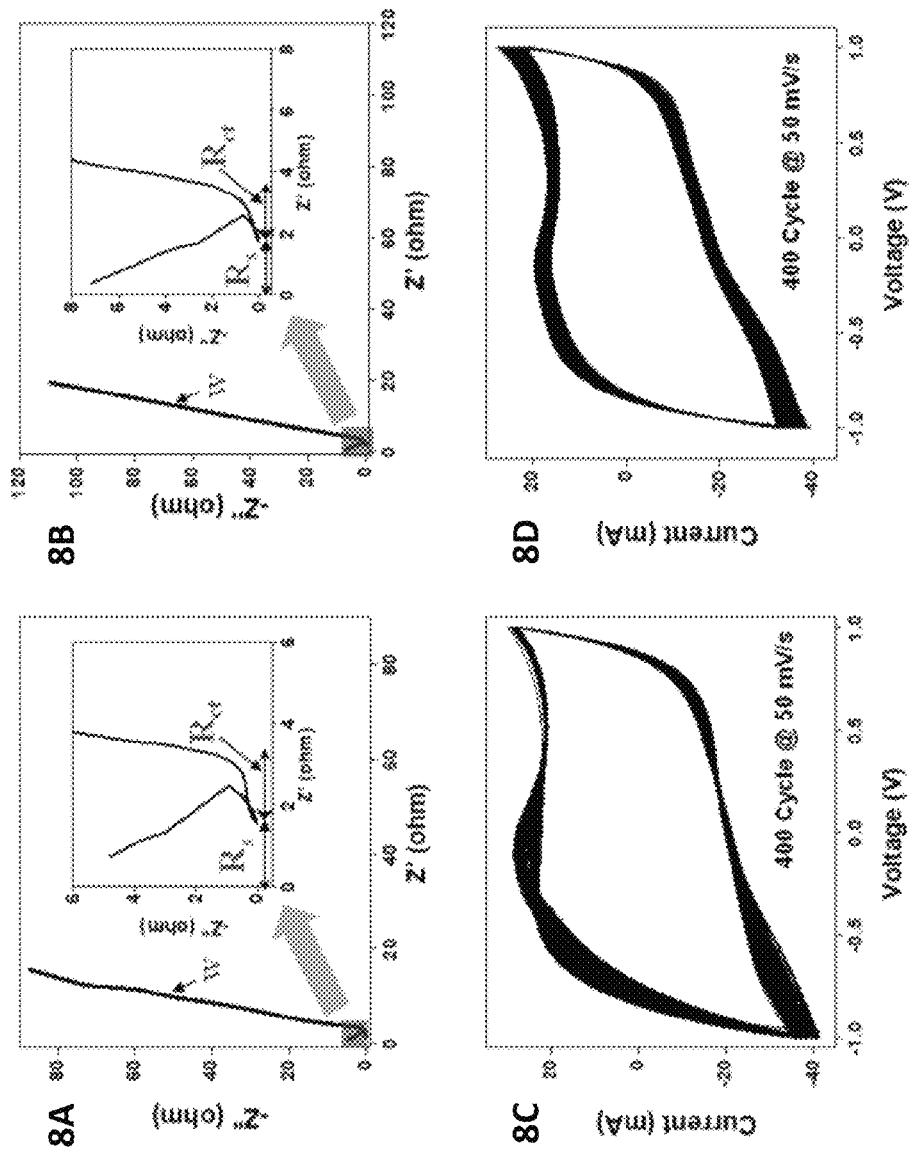
FIG. 8 Nyquist Plots of A) +Ve EAIERs electrode (the inset chart shows the magnified high frequency region), B) –Ve EAIERs electrode (the inset chart shows the magnified high frequency region); C) and D) are cyclic repeatability of +Ve EAIERs electrode and –Ve EAIERs electrode at a fixed scan rate of 50 mV/s, respectively in 1 M NaCl as the electrolyte.

FIGS. 8 A and 8B illustrate the Nyquist Plot of +Ve EAIERs electrode (expanded view is shown in insert) and –Ve EAIER electrode (expanded view is shown in insert). Electrochemical impedance spectroscopy (EIS) was performed in 1 M NaCl electrolyte solutions with frequency range between 3 MHz to 5 mHz. To characterize the interfacial transport property including electrical conductivity of the material, we studied the Nyquist plot with the help of the EIS measurement for +ve EAIERs and –ve EAIERs electrodes. As shown in FIGS. 8A and 8B, the Nyquist plot constitutes two regions between Z' (real axis) and Z" (imaginary axis), corresponding to a semicircle at high-frequency and followed by a straight line in the low frequency region. In the high frequency region, first intercept of the semicircle is expressed as the equivalent series resistance (ESR), reflecting the diffusion and transport of ions in the electrolyte [Dutta, S. et al., *ACS Sustain Chem. Eng.*, 2016, 4,1885-1893]. It is well known that a Nyquist plot is divided into several regions: (1) a high-frequency intercept on the real Z (real) axis, (2) a semicircle in the high-to-medium frequency region corresponding to the charge transfer resistance ($R_{ct}$), and (3) a straight line at the very low-frequency region (w) or bulk resistance (Zhang, D. et al, *Nanoscale*, 2012, 4, 5440-5446).

Notably, the quasi-semicircle of the +ve EAIERs and −ve EAIERs with small arc size is observed, suggesting a low charge transfer resistance. In this low-frequency region, the straight line is evident for an ideal electrical double layer capacitance and fast ion diffusion behavior resulting from low Warburg diffusion resistance. The diameter of the semicircle always indicates the polarization resistance, which reflects the charge-transfer resistance between the electrodes and the solution interface. Clearly, the diameter of the second semicircle is very small which indicates the negligible charge transfer resistance of the electrodes. The x-intercept of the plots reflect the equivalent series resistance (ESR), which is related to the internal resistance, including the electrodes resistance, ionic resistance of NaCl solution and the contact resistance between the carbon material and the current collector. Hence, the +ve EAIERs and −ve EAIERs electrode have a favorable accessibility for ions. This result reflects the fact that the EAIERs electrode exhibits good charge storage behavior with the electrical double layer capacitive (EDLC) mechanism. To sum up, the EAIERs electrode possesses low internal resistance and good conductivity. The EIS results demonstrate that the EAIERs electrodes have easier transport pathways for salt ions and is more suitable for CDI. In FIGS. 8C and 8D, Cyclic Voltammogram performed on +ve EAIERs and −ve EAIERs electrodes, testing their reproducibility 400 times, at a scan rate of 50 mV/s. This experiment was done with 1 M NaCl electrolyte solution in a potential window of −1.0 to 1.0 V, using platinum wire as the counter electrode and Ag/AgCl as the reference electrode.

Figures 9A, 9B, 9C, 9D:
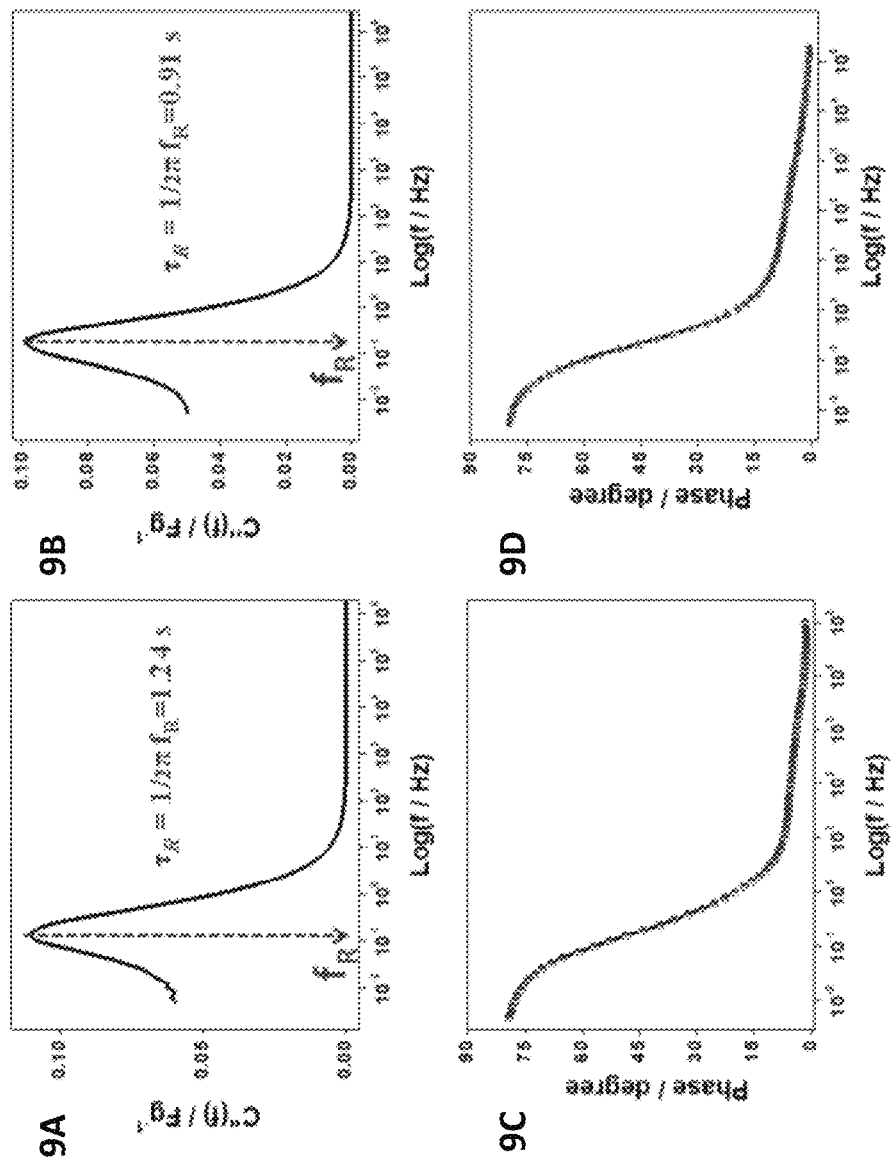
FIG. 9—Complex capacitance vs. frequency plot: desorption rate determination for A) +Ve EAIERs (RGO-PS-$SO_3H$) electrode and B) –Ve EAIERs (RGO-PS-$CH_2$—$N^+(CH_3)_3Cl^-$) electrode; C) and D) are Bode plots for cathode and anode, respectively in 1 M NaCl electrolyte.

FIG. 9A illustrates the complex capacitance vs. frequency plot for the determination of desorption rate of +Ve EAIERs (RGO-PS-SO$_3$H) electrode and FIG. 9B −Ve EAIERs (RGO-PS-CH$_2$—N$^+$(CH$_3$)$_3$Cl$^-$) electrodes. FIGS. 9C and 9D are bode impedance plots for cathode and anode respectively, in 1 M NaCl electrolyte. It is well known that the imaginary part, capacitance C", corresponds to irreversible energy dissipation and represents a relaxation process during ion transport [Yoon, S. et al., *Electrochim. Acta.*, 2015, 50, 2255; Jang, J. H. et al., *J. Electrochem. Soc.*, 2004, 151, A571; Jang, J. H. et al., *J. Electrochem. Soc.*, 2005, 152, A1418]. The relaxation time constants of the adsorption and desorption processes are correlated to the peak frequency (or relaxation frequency) $f_R$, as: $\tau_R=1/(2\pi f_R)$ [Huang, C. W. et al, *Carbon* 2011, 49, 895]. As a result, $\tau_R$ was 1.24 s for +ve EAIERs and 0.91 s for −ve EAIERs electrode. EIS was performed with varying frequency from 3 MHz to 5 mHz (FIGS. 8 A, 8 B, and 9). The rate capability and ions transport through a porous electrode can be quantitatively related to the relaxation time constant. The peak corresponding to C" was used to identify the relaxation time constants and quantitatively study the rate capability of the EDLC electrodes. The relaxation time constant increases with increasing shell thickness. FIGS. 9C and 9D are the corresponding bode plots for EIS measurements shown in FIGS. 8A and 8B, respectively. Electrochemical characterization of electrodes indicates high conductivity, porosity and capacitance (FIGS. 7, 8, 9 and 10).

Figure 10:
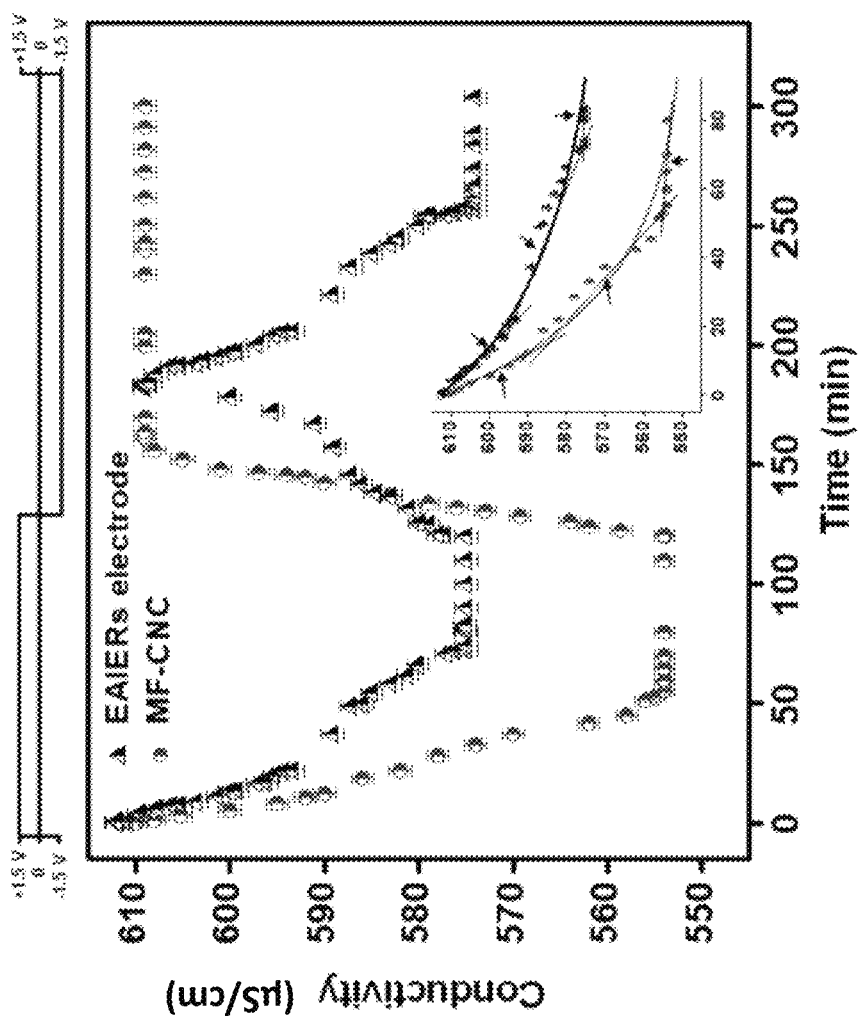
FIG. 10—Comparison of CDI performance between covalently integrated EAIERs (RGO-PS functionalized) electrode and carbon prepared from melamine functionalized carbon nanocellulose (CMF-CNC) electrode in 610 µS NaCl solution and the electrosorption kinetics for the integrated EAIERs and CMF-CNC electrodes are shown in the inset. The variation in potential on the electrodes with time is shown on top of the figure.

The performance of integrated CDI electrodes (EAIERs) was compared with conventional CDI carbon electrodes. The carbon powder prepared from melamine functionalized nanocellulose (MF-CNC) was used for conventional CDI (CMF-CNC). It is evident from FIG. 10 that the RGO-PS-functionalized (EAIERs) electrodes have higher adsorption capacity (~15.86 mg/g) than CMF-CNC electrodes (~7.45 mg/g) for Cl-ions at 610 µS NaCl solution. In the case of EAIERs electrodes, the adsorption occurs in the first 58 min and attains an equilibrium. After 120 min, by reversing the polarity of the electrodes, desorption starts to occur. The concentration of the solution approaches the initial value of 610 µS, as all the adsorbed ions desorb and the adsorption sites are regenerated. The electrodes remain at equilibrium until the potential is again reversed. Similarly, CMF-CNC electrodes were tested to compare the adsorption and desorption capacities. They took ~73 min to attain the adsorption equilibrium. By reversing the polarity after 120 min, desorption was observed which regenerated the adsorption sites on the electrode. Unlike EAIERs, the CMF-CNC electrodes again start to adsorb ions before all the ions are desorbed from the electrodes. This is the key difference between the two electrodes. The electrosorption kinetics for the integrated EAIERs and CMF-CNC electrodes are shown in the inset of FIG. 10. The EAIERs electrodes show three different adsorption kinetics until reaching equilibrium. Initially, within the first ~11 min, the adsorption was fast, from ~11-53 min, adsorption was moderate and from ~53-64 min, the adsorption was very slow. Similarly, a CMF-CNC electrode also shows three different adsorption kinetics, initial within the ~20 min, the adsorption was fast, during ~20-71 min, it was slow and from ~71-80 min, the adsorption was very slow. This shows that EAIERs electrodes have more active adsorption sites than conventional CDI electrodes during the same contact time.

The electrical adsorption capacity of the electrode material depends on: i) the thickness of ELDs, ii) hydrated ionic radii, iii) ionic charge and iv) initial concentration of the solution. To determine the abovementioned parameters for EAIERs electrodes, a set of different concentrations of NaCl, MgCl$_2$ and FeCl$_3$ solution were prepared as an electrolyte and a CDI batch experiment was performed using 1.5 V DC power source (optimized). Electrochemical adsorption capacity was measured from an adsorption-desorption curve, shown in FIGS. 11 and 12.

Figures 11A, 11B, 11C, 11D, 11E, 11F:
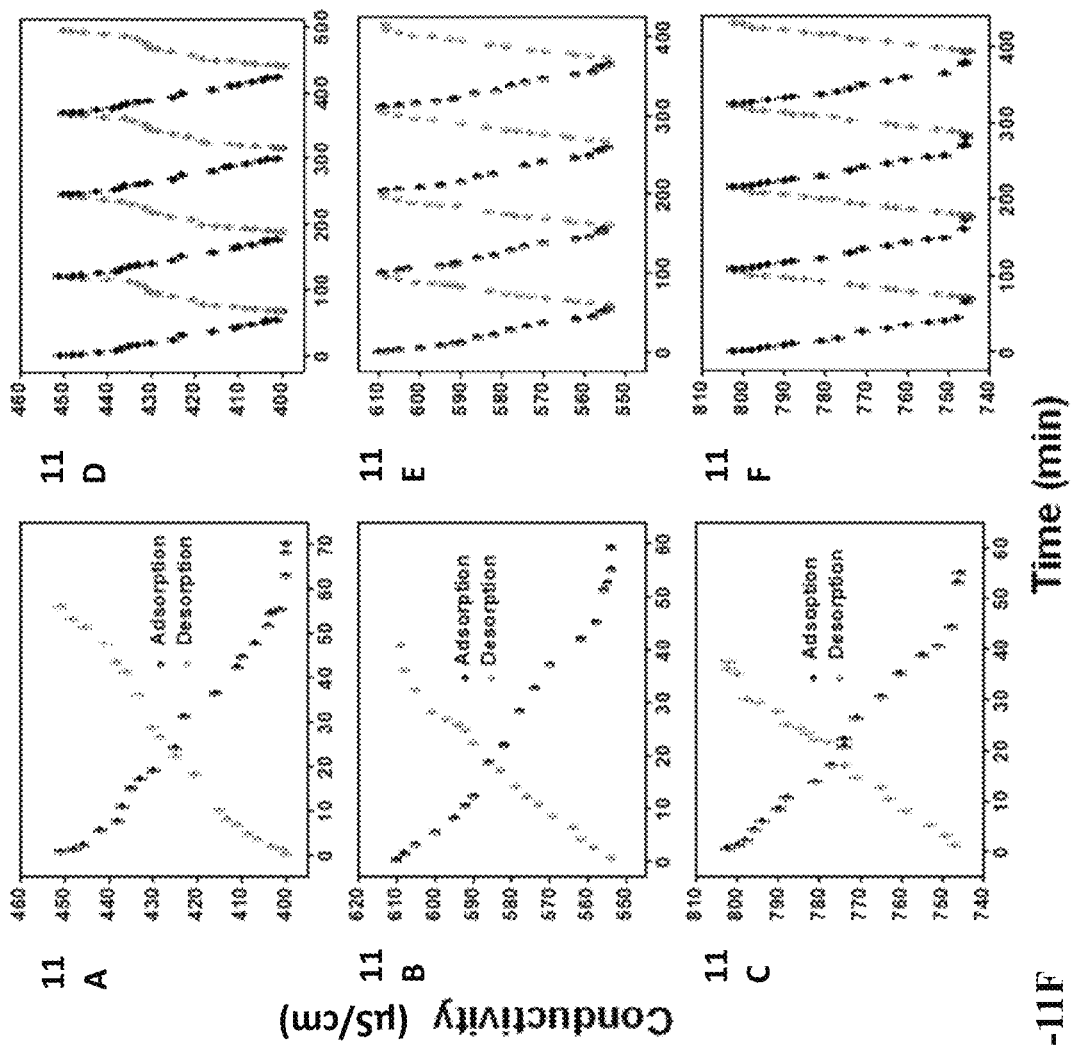
FIG. 11—The adsorption capacity of a covalently integrated EAIERs electrodes with different conductivities of NaCl solution A) 450, B) 610 and C) 802 µS as a function of applied voltage at 1.5 V; Electrode repeatability (four adsorption-desorption cycles) performances are shown in D), E) and F).

FIGS. 11A-11C illustrate the adsorption capacity of a covalently integrated EAIERs electrodes with different conductivities. It was observed that with an increase in the concentrations of NaCl ions, the adsorption capacity of the EAIERs electrodes increases. The values are 14.45, 15.86 and 15.93 mg/g for Cl$^-$ ions of NaCl with conductivities of 450, 610 and 802 µS, respectively.

The adsorption capacity values obtained are much higher compared to pristine RGO/grapheme based CDI electrodes in batch experiments reported earlier. Adsorption-desorption performance of the electrodes is shown in FIGS. 11 (D-F). Only four cycles of electrode adsorption-desorption are presented in the figures, but it was seen that even after ten cycles, the efficiency remains the same. Therefore, from the performance and repeatability point of view, our material can be used as CDI electrode for getting potable water from brackish water.

Figures 12A, 12B, 12C, 12D, 12E, 12F:
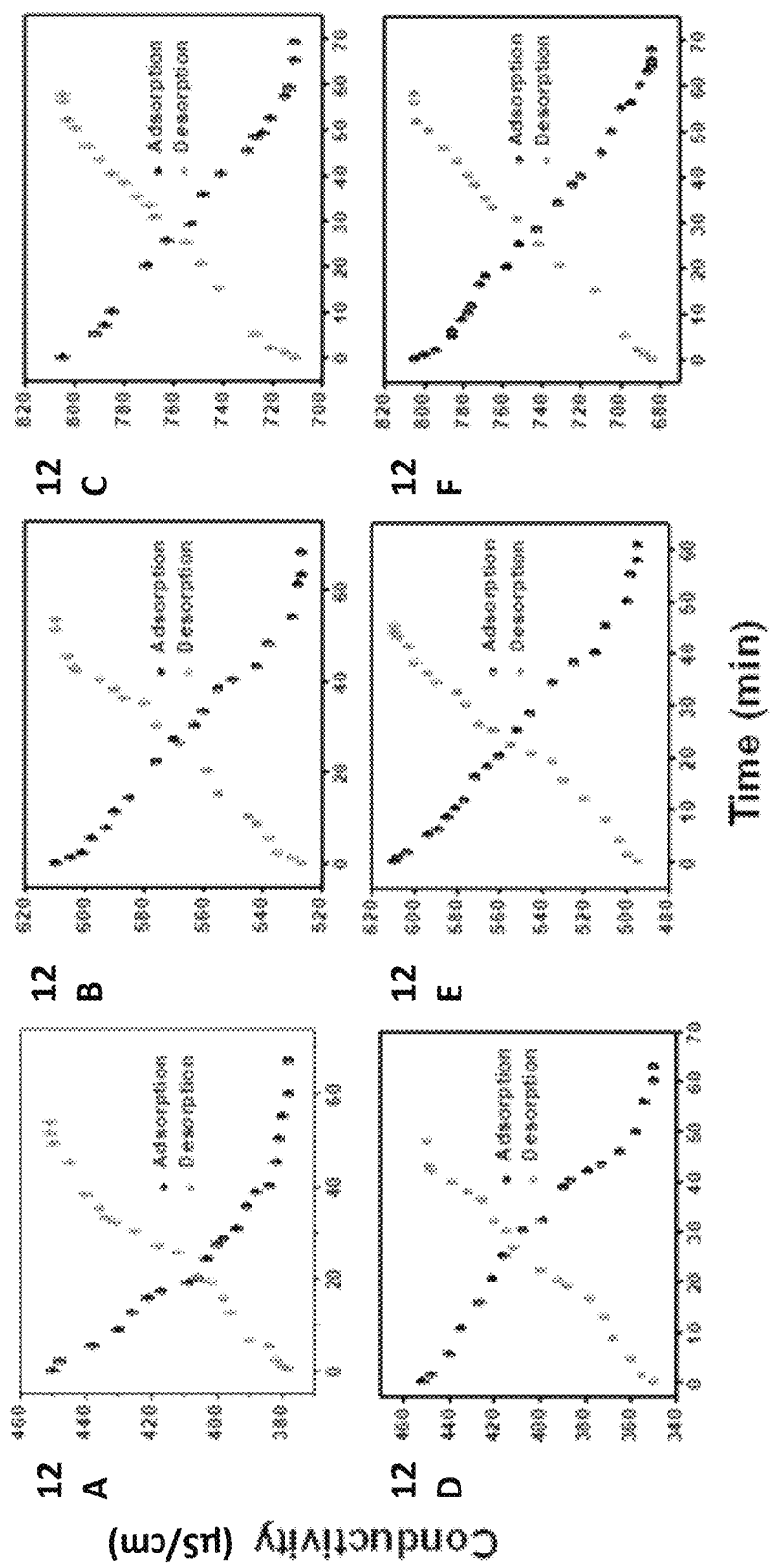
FIG. 12—The adsorption capacities of a covalently integrated EAIERs with $MgCl_2$ and $FeCl_3$ at different conductivities of 450 (A and D), 610 (B and E) and 802 µS (C and F) as a function of the applied voltage, at 1.5 V.

FIGS. 12A-12C illustrate conductivity vs time plots upon varying the concentration of MgCl$_2$ ions in the solution. For the input conductivity of 450, 610 and 802 µS/cm, the adsorption capacity of $Mg^{2+}$ ions were 20.40, 23.51 and 26.63 mg/g, respectively. FIGS. 12D-12F illustrate that the adsorption capacity of $Fe^{3+}$ ions were 28.9, 32.58 and 34.28 mg/g keeping the initial conductivity of 450, 610 and 802 µS/cm, respectively. It was observed that in both the cases of anion and cation, adsorption capacity of the EAIERs electrode increases with increase in the concentration of ions, as shown in FIGS. 10, 11 and 12.

Figures 13A, 13B, 13C, 13D, 13E, 13F:
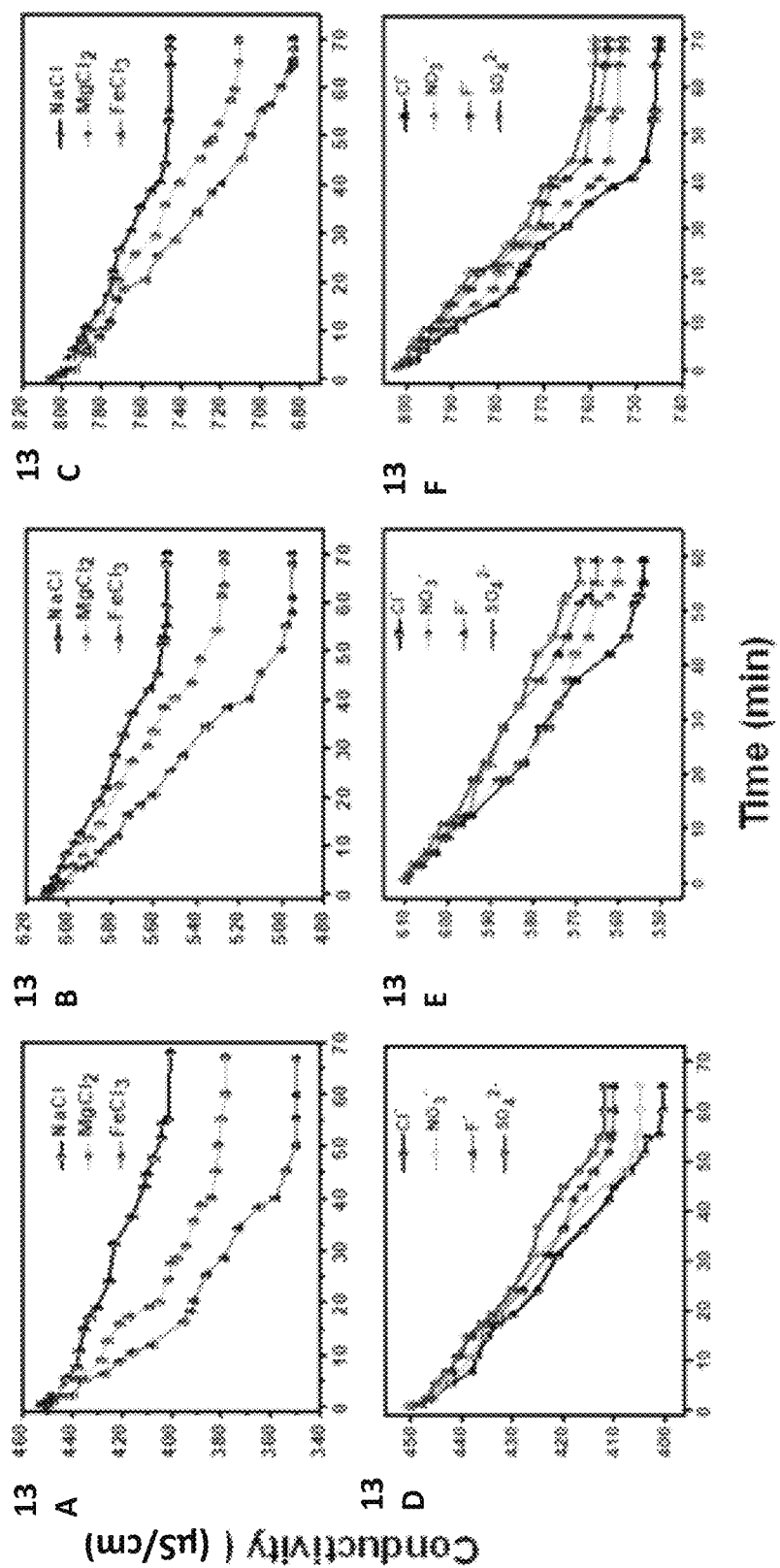
FIG. 13—CDI performances of EAIERs using different cations ($Na^+$, $Mg^{2+}$ and $Fe^{3+}$) with conductivities of A) 450, B) 610 and C) 802 µS, respectively. Similarly, anions ($Cl^-$, $NO_3^-$, $F^-$ and $SO_4^{2-}$) with conductivities of D) 450, E) 610 and F) 802 µS, respectively. Operating potential: 1.5V.

FIGS. 13A-13C illustrate a comparison of the adsorption capacity of EAIERs for different cations having the same initial concentrations in the solution. It is evident that adsorption capacity of the material follows the trend, $Fe^{3+}>Mg^{2+}>Na^+$ for the cations keeping $Cl^-$ as the anion for all the cases. It was seen that with the increase in the charge of cations, adsorption capacity increases. Therefore, various properties such as the ionic charge, ionic radii and hydrated radii of different cations ($Na^+$, $Mg^{2+}$ and $Fe^{3+}$) and anions ($NO_3^-$, $F^-$, $Cl^-$ and $SO_4^{2-}$) are important for adsorption. For the cations, it was observed that with an increase in the valency of the metal ions, the adsorption capacity increased, but reverse trend was observed in the case of anions (keeping cation ($Na^+$) as same). The hydrated radius of $Fe^{3+}$ ion is largest compared to $Na^+$ ion which is smallest among these cations. Therefore, on the basis of the above explanation, the adsorption capacity must follow the order, $Na^+>Mg^{2+}>Fe^{3+}$ but the reverse trend was observed. In the case of cations, the charge is the predominant factor than the hydrated radius. When a potential is applied on the electrodes, the cation with higher charge will be adsorbed more compared to a cation with lower charge. Therefore, trivalent $Fe^{3+}$ ions were adsorbed at a faster rate than divalent $Mg^{2+}$ ions on the electrode surface, followed by $Na^+$ ions. But in case of anions, adsorption capacity decreases with increase in the charge of the anion. The adsorption capacity of the material for anions shows that $Cl^->NO_3^->F^->SO_4^{2-}$ at different concentrations FIGS. 13D-13F). In case of anions, hydration radii are more important than charge. The size of the hydrated radii of these anions decreases as $SO_4^{2-}>F^->Cl^-$, $NO_3^-$. Anions with smaller hydrated radius will pass through the pores and will reach the electrode surface with ease and the same trend ($Cl^->NO_3^->F^->SO_4^{2-}$) was observed.

Figures 14A, 14B:
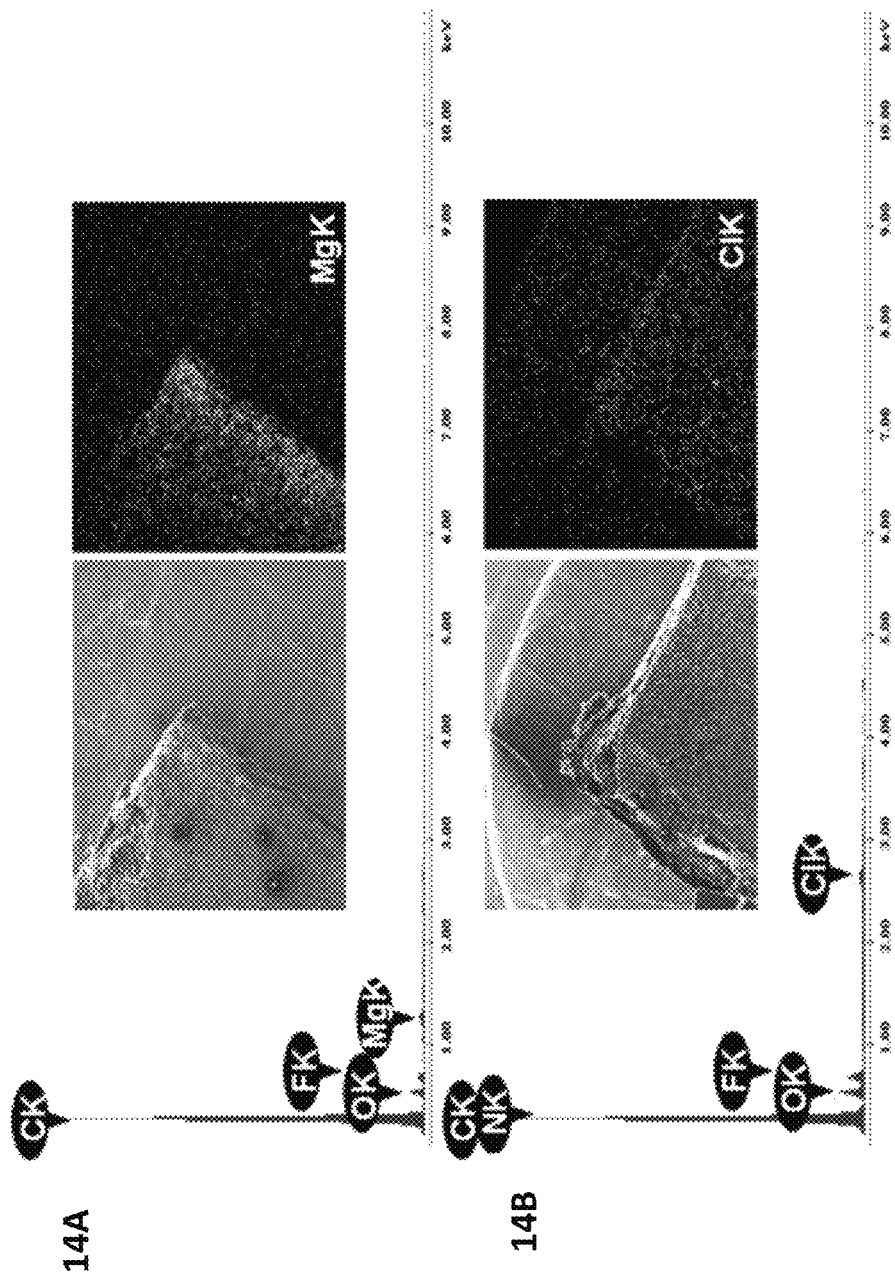
FIG. 14—SEM EDS of MgCl$_2$ adsorption after a single adsorption cycle on A) cathode and B) anode. The corresponding SEM EDS and elemental mapping images are shown in the inset.
Figure 15:
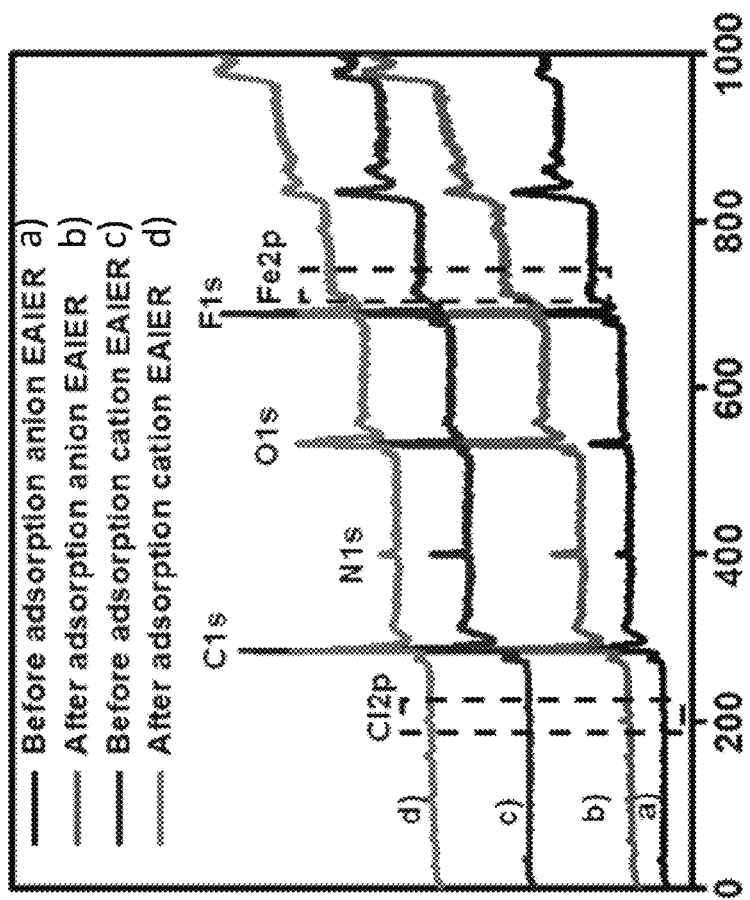
FIG. 15—XPS survey spectra of the material after single adsorption cycle, (a) anode and (c) cathode (before adsorption); (b) anode and (d) cathode (after FeCl$_3$ adsorption).
Figures 16A, 16B:
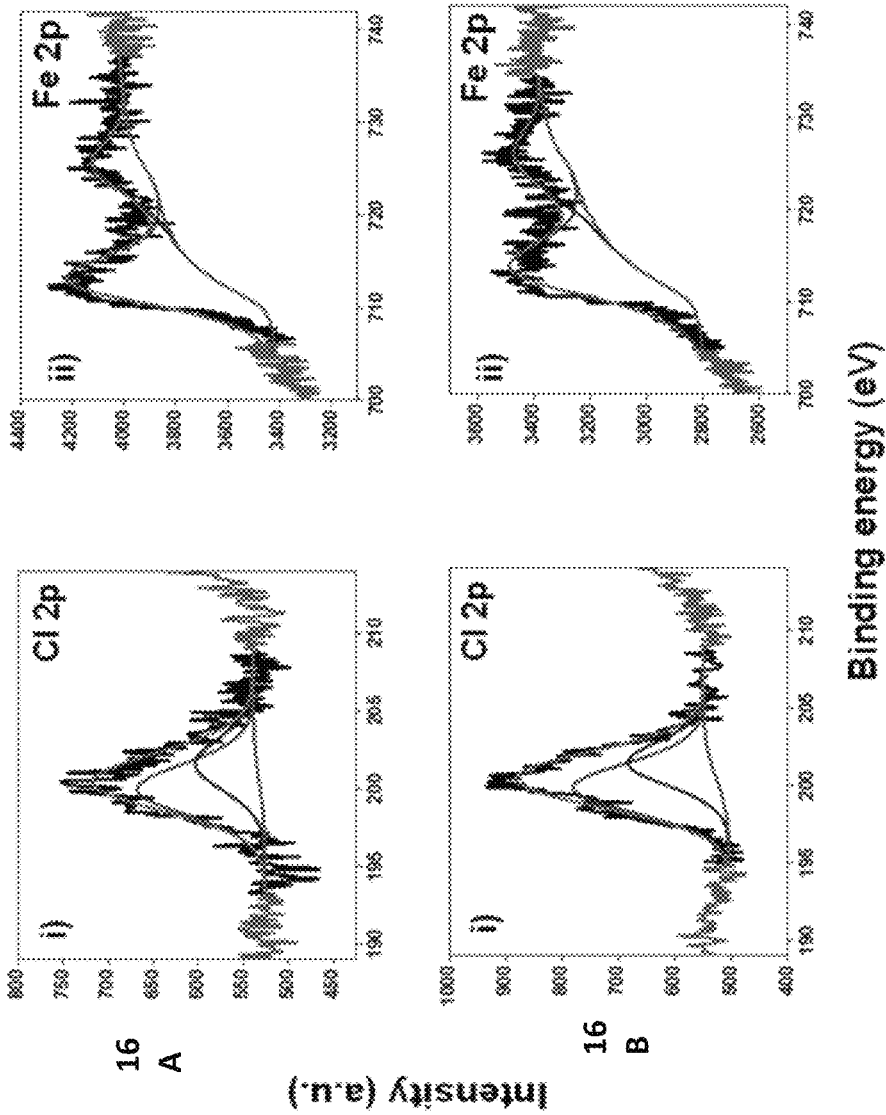
FIG. 16—Deconvoluted XPS spectra of Ai) Cl 2 p, Aii) Fe 2 p of the cathode and Bi) Cl 2 p, Bii) Fe 2 p of anode after the adsorption of FeCl$_3$.

The integrated EAIERs electrodes surfaces were characterized with SEM EDS and XPS after one adsorption cycle (FIGS. 14, 15 and 16). Electrodes were kept for a long time for adsorption in $MgCl_2$ and $FeCl_3$ solutions until the equilibrium was reached. They were then washed with deionized water to remove the physisorbed ions and were analyzed using SEM EDS and XPS, respectively.

FIGS. 14A and 14B illustrate SEM EDS of the electrodes after adsorption of $MgCl_2$. It was observed that $Mg^{2+}$ and $Cl^-$ ions were adsorbed on the cathodic and anodic surfaces, respectively. The inset of FIG. 14 shows the SEM EDS and the elemental maps of the ions that were adsorbed on the surfaces.

FIG. 15 illustrates XPS survey spectra of the anodic and cathodic EAIERs electrodes after single adsorption cycle, before and after adsorption of $FeCl_3$ ions. In the XPS survey spectra, no significant changes in the binding energy of carbon, nitrogen, oxygen and fluoride feature corresponding to the cathode and anode were observed before and after the adsorption. The XPS survey spectra (FIG. 15) and deconvoluted XPS spectra (FIG. 16) show the enhanced intensity of $Fe^{3+}$ and $Cl^-$ at cathode and anode, respectively. Small amounts of $Cl^-$ on cathode and $Fe^{3+}$ on anode were detected due to diffusion of the ions at the electrodes as they were dipped in the $FeCl_3$ solution.

It may be appreciated by those skilled in the art that the drawings, examples and detailed description herein are to be regarded in an illustrative rather than a restrictive manner.

We claim:

1. An electrode assembly for capacitive deionization (CDI) comprising:
   a) at least one electrode made of chemically-linked cation exchange resin molecular constructs synthesized by in-situ polymerization of a styrene resin monomer and a two-dimensional material selected from the group consisting of reduced graphene oxide (RGO), molybdenum disulfide ($MoS_2$), tungsten diselenide ($WSe_2$), tungsten disulfide ($WS_2$) and any combination thereof, the in-situ polymerization comprising mixing the styrene resin monomer with the two-dimensional material, to obtain a two-dimensional material polystyrene composite, followed by functionalization of the two-dimensional material polystyrene composite with a sulfonate and/or a carboxylate moiety;
   b) at least one electrode made of chemically-linked anion exchange resin molecular constructs synthesized by in-situ polymerization of a styrene resin monomer and a two-dimensional material selected from the group consisting of reduced graphene oxide (RGO), molybdenum disulfide ($MoS_2$), tungsten diselenide ($WSe_2$), tungsten disulfide ($WS_2$) and any combination thereof, to obtain a two-dimensional material-polystyrene composite, followed by functionalization of the two-dimensional material polystyrene composite with an amine moiety;
   wherein, electro-desorption during CDI does not lead to readsorption and consequent reduction of adsorption capacity of a deionization system comprising the electrode assembly.

2. The electrode assembly as claimed in claim 1, wherein the two dimensional material is reduced graphene oxide (RGO).

3. The electrode assembly as claimed in claim 1, wherein the two-dimensional material polystyrene composite further comprises at least one other carbon material to enhance the adsorption performance of the CDI cell.

4. The electrode assembly as claimed in claim 1, that is configured to be used for removing salts from brackish water.

5. The electrode assembly as claimed in claim 4, that in operation removes cations of different charge.

6. The electrode assembly as claimed in claim 4, that in operation removes anions of different charge.

7. The electrode assembly as claimed in claim 1, that in operation removes positively and negatively charged ions from impure water.

8. The electrode assembly as claimed in claim 1, wherein the adsorption and desorption occur at equal efficiency for multiple cycles.

9. The electrode assembly as claimed in claim 1 that is configured to be used along with other deionization and purification methods to enhance efficiency of removal of ions.

10. The electrode assembly of claim 5 that in operation removes $Fe^{3+}$, $Mg^{2+}$ and $Na^+$ ions.

11. The electrode assembly of claim 6 that in operation removes $Cl^-$, $NO_3^-$, $F^-$, $SO_4^{2+}$, arsenite and arsenate ions.

12. The electrode assembly of claim 3, wherein the additional carbon material is selected from the group consisting of carbon nanotubes (CNTs), fullerenes and carbon fibers.

13. The electrode assembly of claim 1, wherein the two dimensional material is RGO.

14. The electrode assembly of claim 1, wherein the molecular constructs a) and b) are prepared by in situ polymerization of polystyrene with divinylbenzene in the presence of a suspension of RGO.

* * * * *